(12) United States Patent
Tooman

(10) Patent No.: US 8,726,589 B2
(45) Date of Patent: May 20, 2014

(54) WIND TURBINE INSTALLATION COMPRISING AN APPARATUS FOR PROTECTION OF ANCHOR BOLTS AND METHOD OF INSTALLATION

(76) Inventor: Norman L. Tooman, Bakersfield, CA (US)

( * ) Notice: Subject to any disclaimer, the term of this patent is extended or adjusted under 35 U.S.C. 154(b) by 301 days.

(21) Appl. No.: 13/109,927

(22) Filed: May 17, 2011

(65) Prior Publication Data

US 2012/0124924 A1   May 24, 2012

Related U.S. Application Data

(62) Division of application No. 12/012,137, filed on Jan. 30, 2008, now Pat. No. 7,975,519.

(51) Int. Cl.
*E04C 5/08* (2006.01)
*E02D 27/00* (2006.01)
*E02D 27/32* (2006.01)

(52) U.S. Cl.
USPC .............................. 52/223.4; 52/295; 405/231

(58) Field of Classification Search
USPC ......... 52/223.4, 292, 294, 295, 296; 405/229, 405/231, 233, 244, 256
See application file for complete search history.

(56) References Cited

U.S. PATENT DOCUMENTS

| | | | | |
|---|---|---|---|---|
| 5,586,417 A | * | 12/1996 | Henderson et al. | 52/295 |
| 5,826,387 A | * | 10/1998 | Henderson et al. | 52/295 |
| 6,672,023 B2 | * | 1/2004 | Henderson | 52/296 |
| 7,155,875 B2 | * | 1/2007 | Henderson | 52/741.15 |
| 7,533,505 B2 | * | 5/2009 | Henderson | 52/292 |
| 7,618,217 B2 | * | 11/2009 | Henderson | 405/255 |
| 2008/0152459 A1 | * | 6/2008 | Tooman et al. | 411/372.5 |
| 2009/0044482 A1 | * | 2/2009 | Tooman | 52/699 |
| 2011/0138720 A1 | * | 6/2011 | Tooman et al. | 52/295 |
| 2012/0124924 A1 | * | 5/2012 | Tooman | 52/296 |

* cited by examiner

*Primary Examiner* — Andrew J Triggs
(74) *Attorney, Agent, or Firm* — James M. Duncan, Esq.; Klein DeNatele Goldner

(57) ABSTRACT

A wind turbine installation comprises anchor bolts having a sheath or sleeve which extends above the cement foundation and the overlying grout layer. If desired, the sleeve may partially extend inside the base flange of the wind turbine tower. The sleeve may be manufactured from polypropylene, polyethylene or other materials having satisfactory mechanical properties, primarily that the material be capable of withstanding sufficient plastic deformation to cause the material to conform to the shape of the threads of the anchor bolts without the material failing. This swaging operation results in a crimped end which forms an interference fit with the threads of the anchor bolt thereby preventing or limiting the intrusion of water or other liquids into the bolt-sleeve annulus during the installation of the turbine foundation.

4 Claims, 10 Drawing Sheets

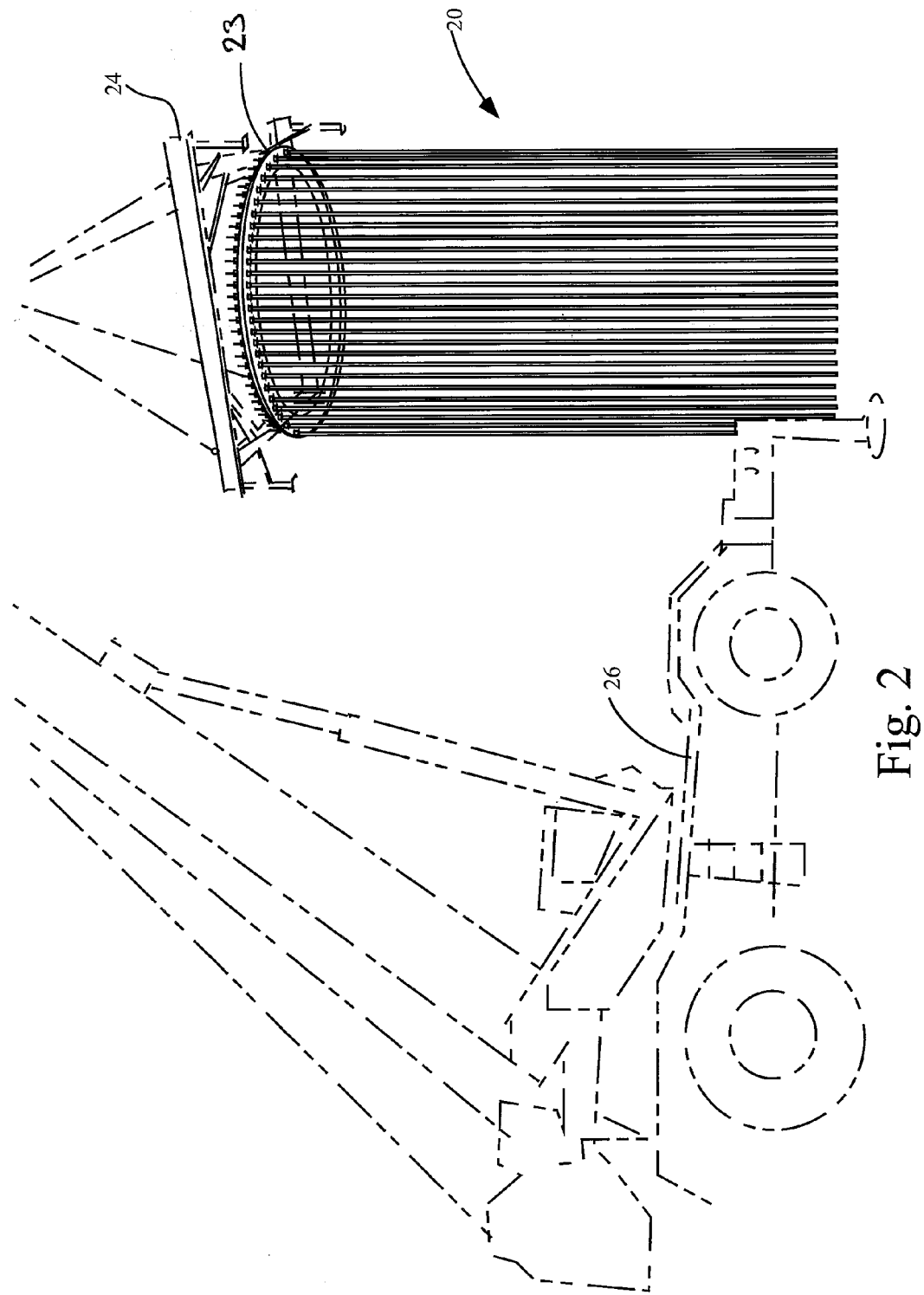

WIND TURBINE INSTALLATION COMPRISING AN APPARATUS FOR PROTECTION OF ANCHOR BOLTS AND METHOD OF INSTALLATION

CROSS-REFERENCE TO RELATED APPLICATIONS

This is a Divisional Application of U.S. patent application Ser. No. 12/012,137 which was filed on Jan. 30, 2008 for which application this inventor claims domestic priority.

BACKGROUND OF THE INVENTION

This invention generally relates to wind turbines, and anchoring devices, such as bolts, which are used in the foundations because of the high overturning moments wind turbines are subjected. The invention more specifically relates to a plastic bolt sleeve used in combination with a threaded anchor, where the plastic sleeve is plastically deformed or "crimped" onto a portion of the threads of the bolt. The invention further discloses methods and devices for crimping the sleeve onto a portion of the bolt threads. Among other benefits, the crimped bolt sleeve protects the anchor bolts from moisture and resulting corrosive attack.

The bolts used for anchoring wind turbines may either be set in concrete or drilled into the rock. The integrity of the foundation of a wind turbine is subject to failure if the anchor bolts are not adequately protected. In particular, anchors are subject to corrosive attack caused by the accumulation of water or other electrolytes in the anchoring hole which results in the creation of a corrosion cell. As described below, the practices employed in preparing the foundation for a wind turbine often create an environment in which the anchor bolt is exposed to water or other liquid.

By way of background for wind turbine foundations, U.S. Pat. Nos. 5,586,417 and 5,826,387, both by Henderson, disclose a pier foundation "which can be poured-on-site monolithically and is of cylindrical construction with many post-tensioned anchor bolts which maintain the poured portion of the foundation under heavy compression, even during periods when the foundation may be subject to high overturning moment." Henderson's foundation is preferably in the shape of a cylinder, having an outer boundary shell and an inner boundary shell each formed of corrugated metal pipe which are set within an excavation.

In the fabrication of foundations for wind turbines, elongated high strength steel bolts, generally fashioned from 1¼" (#10) rebar material or 1⅜" (#11) rebar material are set within the foundation excavation and concrete poured into the excavation such that the bolts extend vertically up through the concrete from a peripheral anchor plate or ring near the bottom of the cylinder to a peripheral connecting plate or flange at the base of the wind turbine tower. The bolts are typically threaded at the top and bottom ends for a length of approximately 24 inches. The bolts are largely contained within through hollow sleeves made of PVC which prevent adhesion of the concrete to the bolts. The sleeves are typically installed prior to delivery of the bolts to the job site, and nuts must be placed on each end of the anchor bolt to retain the PVC sleeve on the anchor bolt material.

Henderson further discloses the post-stressing of the concrete in great compression by tightening the high strength bolts to provide heavy tension from the heavy top flange (i.e., the flange at the base of the wind turbine) through which the bolts pass to the anchor flange or plate at the bottom of the foundation, thereby placing the entire foundation, between the heavy top plate or flange and lower anchor plate or flange, under high unit compression loading. The nuts on the bolts are tightened so as to apply tension to the bolts exceeding the maximum expected overturning force of the wind turbine tower structure on the foundation. Therefore, the entire foundation withstands various loads with the concrete always in compression and the bolts always in static tension. Because the bolts are each largely contained within a PVC sleeve, each bolt is free to move within its sleeve as the bolts are tensioned by tightening the nuts abutting the top flange. Steps are typically taken before the concrete is poured to seal the tops of the PVC sleeves to prevent the flow of concrete into the sleeves, such as wrapping duct tape around the tops of the sleeves. This can be a time-consuming process.

Based upon the discussion above, it is clear that the integrity of this type of foundation is dependent upon the integrity of the anchor bolts—the failure of a bolt creates a stress riser on the remaining bolts, leading to the potential failure of the entire foundation. The integrity of the steel anchor bolts can be compromised by corrosive attack. As described above, according to the current practice each anchor bolt is enclosed for most of its length within a PVC sleeve. However, because the outside diameter of the PVC sleeve is too large for the sleeve to enter the bolt hole of the flange of the tower structure, the sleeve typically terminates at approximately the top of the concrete foundation, with the bare metal of the anchor bolt extending above the sleeve, where the bolts extend through the flange and have a nut and bolt cap installed on the top side of the flange.

The tower flange is usually set on a grout base which overlies the concrete foundation. The grout base is placed within a circular "grout trough" which is formed by the pouring of the concrete foundation around a circular template. This circular template is utilized to collectively lift and place the anchor bolts within the excavation prepared for the foundation. As with the holes of the flange of the tower base, the bolt holes in the circular template are sized to accommodate the bolt diameter, but not the diameter of the PVC sleeve, so the tops of the bolt sleeves will generally be flush with the bottom of the grout trough formed by the circular template.

In order to prevent dehydration of the grout—thus adversely impacting the grout strength—it is a common practice to place water within the grout trough prior to the pouring of the grout to keep the grout properly hydrated during the curing process. However, water placed in the trough will gravitate into the ends of the PVC sleeves which are flush with the bottom of the grout trough. In the current installation practice, a foam sleeve is typically placed around a portion of each bare bolt extending above the bottom of the grout trough, with each foam sleeve and held in place with duct tape. The length (or height) of the foam sleeve is sized to extend above the anticipated thickness of the grout layer within the grout trough. In the known practice, the tower flange is set on the grout before the grout sets so that the tower base may be leveled. It is hoped that the foam sleeve will prevent grout from adhering to the body of the bolt, such that when the grout fully cures the bolt may be tensioned and slide through the foam sleeve without damage to the grout. However, in reality the foam sleeve is likely so deformed by the flange of the tower base that the bolts will not slide freely through the sleeves once the grout cures.

If low viscosity grout is used, the flow properties of the grout will cause it to flow into the annulus created by the PVC sleeve and the anchor bolt. Because of this problem, the use of low viscosity grouts, including epoxy grouts, has not been practical. However, the low viscosity grouts would otherwise be preferred because of the self-leveling characteristics of the grout. In particular, the use of self-leveling grout would eliminate the need for leveling shims and allow the grout to be poured and adequately cure before setting the flange onto the grout, as opposed to the current practice of setting and leveling the tower flange before the grout cures. The current practice requires the service of a high capacity crane for the initial setting of the tower flange and subsequently for the assembly of the complete turbine. However, if the tower flange can be placed at the same time as the other turbine tower components, the crane can be used more efficiently with less rigging up and rigging down time at each turbine tower installation.

Once the tower has been installed and a nut and bolt cap installed on the bolt ends extending above the tower flange, the annulus between the bolt and PVC is sealed. However, during the known installation method, the annulus between the bolt and the PVC sleeve is open thereby providing a pathway for water and other fluids to enter the annulus and be trapped between the PVC sleeve and the metallic bolt, forming a corrosion cell. Because of this opening, steps are usually taken to protect the bolt from corrosive attack and/or to seal the sleeve-bolt annulus during installation. Unfortunately, the currently practiced installation procedure aggravates the situation, because, as described above, the procedure typically includes pouring water in the grout trough to allow the grout to cure. This practice allows to water to accumulate at the top of the PVC sleeve, and potentially migrate into the sleeve-bolt annulus.

The initial attempt at solving the anchor bolt corrosion problem was to paint the anchor bolts along the entire length. However, this solution is labor intensive and does not prevent liquid accumulation around the anchors. In addition, this protection method requires that the anchors be repainted periodically, as well as after re-tensioning the anchor if required in the particular application. The currently practiced method of protecting the anchor bolts is to seal the annulus between the top of the PVC sleeve and the bolt with a sealant, such as a silicon gel.

As discussed above, the current practice also includes placing foam or other material around the portion of the bolt extending above the PVC sleeve, so as to prevent adhesion of the grout to the bolt and to block the migration of water into the sleeve-bolt annulus. Typically, foam cylinders with longitudinal slits are placed around the bolts, with duct tape wrapped around each cylinder, and the cylinder pushed downwardly into contact with the top of the PVC sleeve. However, with the large number of bolts utilized in these types of foundations, it is time consuming and difficult to seal the top of each PVC sleeve with sealant and to install the foam cylinders or similar devices. If hurried, the annulus may not be adequately sealed to prevent the intrusion of water into the PVC-bolt annulus. Moreover, once the tower base flange is set upon the foam cylinders, the cylinders are greatly deformed. It is non-unlikely that when the anchor bolts are tensioned, the bolt does not slide through the foam cylinder, but that the deformed foam cylinder moves within the grout, potentially damaging the integrity of the grout.

The PVC sleeves, because of the outside diameter, displace, in totality, a significant volume of concrete in the foundation, thereby reducing the overall compressive strength of the foundation.

SUMMARY OF THE INVENTION

The present application is directed toward a method and apparatus which addresses the problems identified above. In an embodiment of the disclosed invention, rather than utilizing PVC sleeves which terminate at the bottom of the grout trough, the present invention comprises anchor bolts comprising a sheath or sleeve which extends above the grout trough and, if desired, may partially extend inside the base flange of the wind turbine base. The sleeve may be manufactured from polypropylene, polyethylene or other materials having satisfactory mechanical properties, primarily that the material be capable of withstanding sufficient plastic deformation to cause the material to conform to the shape of the threads of the anchor bolts without failing. The term "polypropylene", when used below, not only includes polypropylene materials, but other plastic materials having mechanical properties which allow those materials to be substituted for polypropylene. In the present application, each anchor bolt comprises a polypropylene sleeve in which a portion of the sleeve is "swaged" onto a portion of the threads of the bolt thereby creating a mechanical seal between the interior of the sleeve and the threads of the bolt. For purposes of distinguishing the presently disclosed sleeve from the prior art sleeves, the presently disclosed sleeve is hereinafter referred to as the "crimped sleeve", although it is to be appreciated that only a portion of the sleeve actually comprises crimping or swaging.

The use of the polypropylene sleeve and the swaging of the sleeve onto a portion of the bolt threads accomplishes several improvements over the known apparatus and methods. The disclosed invention provides a bolt package (i.e. a bolt/sleeve combination) which has an overall diameter less than the overall diameter of the currently utilized bolt-PVC sleeve combination. This reduced diameter allows the bolt and crimped sleeve to extend through the bolt holes of the circular template, and into the bolt holes of the tower flange, which under the known apparatus and method, only a sleeveless bolt would extend. Because the crimped sleeve extends above the top of the grout trough, the encased bolts will not be exposed to water placed within the grout trough. Moreover, because a seal is formed between the top of the crimped sleeve and a portion of the threads of the bolt, access to the annulus between the bolt and the crimped sleeve is either eliminated or substantially reduced, thereby preventing or greatly limiting the axial migration of water or other electrolytes along the length of the bolt. In addition, because the top of the crimped sleeve extends above the level of the grout, the crimped sleeve prevents adhesion of the grout to the bolt, thereby allowing the bolt to move relative to the grout.

As another advantage over the known system, because the crimped sleeve places the top of the sleeve above the level to which grout will be placed, the grout has no access to the sleeve-bolt annulus and low viscosity grout may be utilized. As stated above, low viscosity grout is self-leveling, which allows the grout to cure before the tower base is set upon the grout.

As another advantage, the reduced diameter of the crimped sleeve displaces less cement than the larger diameter PVC sleeve, resulting in a stronger foundation. With respect to the grout around the tower base flange, the crimped sleeve of the present invention displaces less grout than the deformed foam cylinder presently used.

As another advantage, the expense of the materials utilized for the crimped sleeve, such as polypropylene, is less than the expense of the larger diameter PVC sleeves.

BRIEF DESCRIPTION OF THE DRAWINGS

FIG. 2 shows a bolt assembly utilized for the foundation of a wind turbine being lowered into an excavation for the foundation.

DETAILED DESCRIPTION OF THE EMBODIMENTS

Prior Art Bolt Protection Devices

Figure 1:
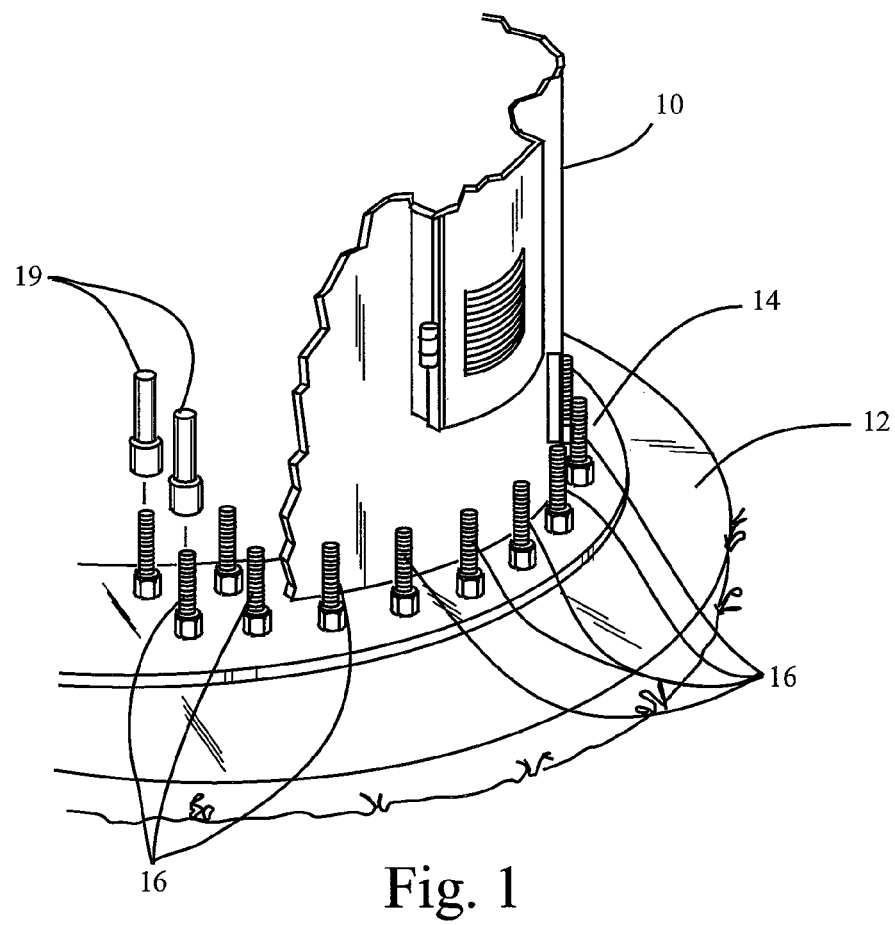
FIG. 1 shows the base of a wind turbine which might utilize embodiments of the disclosed apparatus and method.

FIG. 1 generally depicts the base 10 of a wind turbine set upon a foundation 12. Base 10 comprises a flange 14, by which the base is attached to foundation 12 with anchor bolts 16. As shown in FIG. 1, the anchor bolts 16 may be placed in side-by-side pairs, the pairs extending radially from the center of the foundation 12 forming an inner ring of bolts and an outer ring of bolts. The bolt pattern is, of course, determined by the bolt pattern on the mounting flange 14. Each anchor bolt 16 has a corresponding nut 18 which is used to secure the base 10, and to apply tension to the bolt. The exposed portion of each bolt 16 is usually protected with a bolt cap 19.

A large number of anchor bolts 16 is typically used for this type of foundation. For example, Henderson discloses an embodiment having forty-eight tensioning bolts in the inner ring and forty-eight tensioning bolts in the outer ring for a total of ninety-six. In Henderson's foundation, the lower ends of the bolts are anchored at the bottom of the foundation to a lower anchor ring which may be constructed of several circumferentially butted and joined sections. Although it is to be appreciated that other means may be employed for anchoring the bolts, including drilling a portion of the anchor bolt into the ground.

FIG. 2 depicts a bolt assembly 20 comprising a plurality of anchor bolts 16 being lifted in preparation for being placed within a relatively deep excavation prepared for construction of the foundation 12. The anchor bolts 16 typically used for wind turbines are approximately thirty feet in length, and usually have outside diameters of 1¼ inch or 1⅜ inch. Each anchor bolt 16 is partially enclosed within a "hollow tube" or sleeve 22. The sleeve is typically an elongated plastic tube fabricated from polyvinyl chloride ("PVC") which encases the bolt 16 substantially through the entire vertical extent of the concrete and allows the bolt to be tensioned after the concrete has hardened and cured, thereby post-tensioning the entire concrete foundation. The bolts 16 comprising bolt assembly 20 are secured at the end by circular template 23, which is attached to a lifting assembly 24 and lifted by crane 26.

Figure 3:
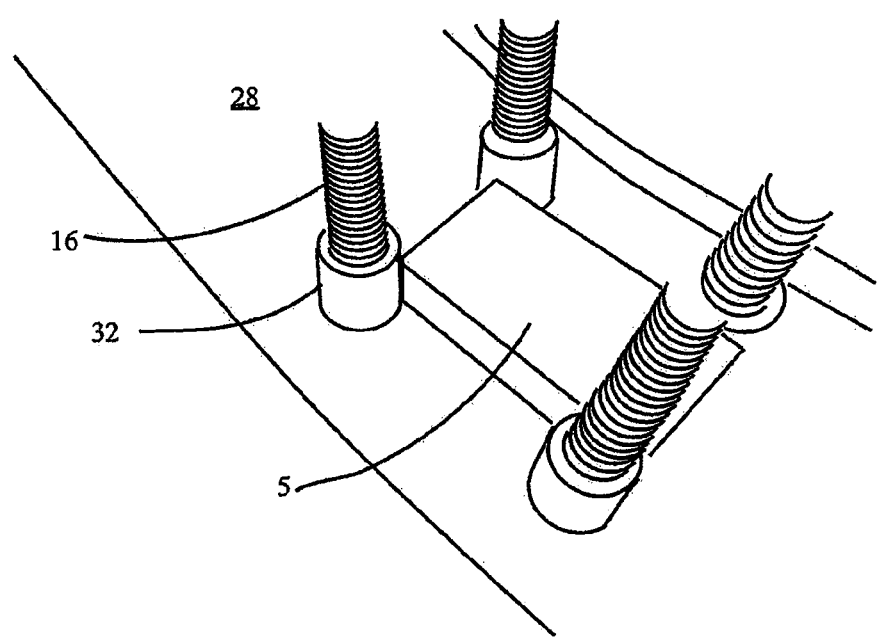
FIG. 3 shows detailed view of a portion of the grout trough prior to the placement of the tower base flange, showing the use of foam sleeves for preventing adhesion of grout onto each bolt body, and the use of a spacer block for leveling the tower base.

FIG. 3 shows a close view of a portion of the grout trough 28 before grout has been poured or base flange 14 has been placed. Grout trough 28 is formed as follows: when the concrete is poured, circular template 23, which remains attached to lifting assembly 24 and held in place by crane 26, holds the bolt assembly 20 in place. Concrete is poured up around circular template 23, thereby forming an inner ring groove in the top of the foundation 12 known as the grout trough 28. Before grout 30 is placed in grout trough 28, a sealing member 32 comprising foam, plastic or other material, is placed around each bolt 16. Sealing member 32 is typically cylindrical in shape, having a circular opening and longitudinal slit cut through from the outside edge to the circular opening so the sealing member may be placed around each bolt 16. The sealing member 32 often has duct tape wrapped around it to secure it to the bolt 16. Also shown in FIG. 3 is a leveling block 5 which is used, in combination with a number of other leveling blocks contained within the grout trough, to properly level the base flange 14. It is to be appreciated that the placement of leveling block 5 immediately adjacent to sealing members 32, which is not an uncommon occurrence in the prior art installations, inhibits the uniform deformation of the sealing members as the base flange 14 is lowered into the grout trough 28, resulting in the non-uniform deformation discussed below.

Figure 4:
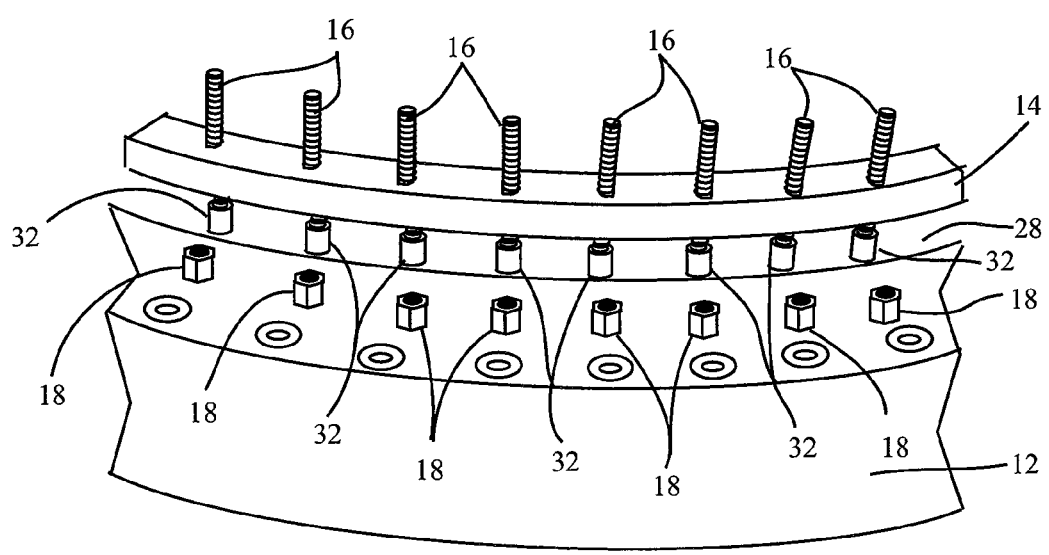
FIG. 4 shows front view of a portion of a tower foundation, with the tower base flange begin lowered onto the anchor bolts.
Figure 5:
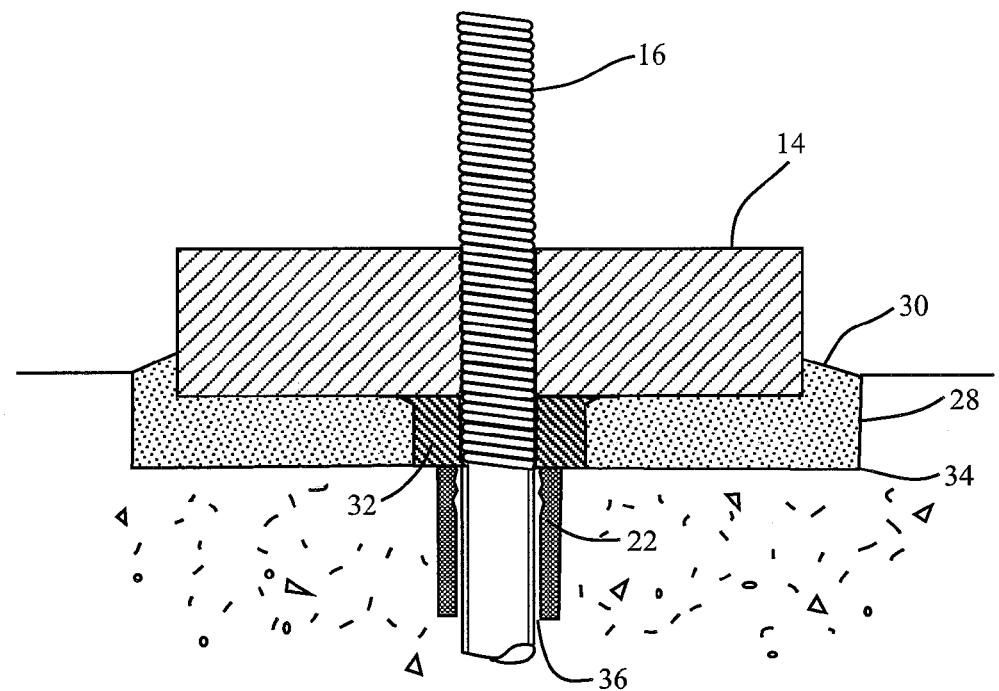
FIG. 5 shows a cross section of a portion of the base flange, grout, and PVC sleeve of a prior art anchor bolt installation.

FIG. 4 depicts a portion of a prior art foundation 12 after the grout has been poured and cured, but before flange 14 has been set upon the foundation and nuts 18 made up onto bolts 16. As shown in FIG. 5, flange 14 will be set on top of the grout 30 contained within grout trough 28.

FIG. 5 shows a cross section of a portion of the base flange 14, grout layer 30, and sleeve 22 of a prior art anchor bolt installation for a wind turbine, where sleeve 22 contains bolt 16. As shown in FIG. 5, the top of sleeve 22 is generally flush with the bottom 34 of grout trough 28. It is to be appreciated that before grout 30 is placed within grout trough 28, the top of sleeve 22 is exposed to whatever liquids may enter the grout trough, such as water which may be placed in the grout trough to provide for hydration of the grout. An annulus 36 is formed between bolt 16 and sleeve 22, which provides a potential path for water or other liquids, such as low viscosity grout, to travel along the length of bolt 16.

As can be seen in FIG. 5, sealing member 32 is substantially deformed once engaged by base flange 14. It is to be appreciated that FIG. 4 shows an idealized view of the deformed sealing member 32, in which the deformation has been uniform. In actuality, it is expected that the deformation will not be uniform because, for example, of obstructions which may inhibit uniform deformation such as the leveling block 5 shown in FIG. 3. It is also to be appreciated that the deformed sealing member 32 displaces more volume than the non-deformed sealing member. Because each bolt requires the sealing member, a typical installation may have ninety-six of the deformed sealing members 32 in the grout trough 28, thereby reducing the overall volume of grout which may be placed, resulting in a final grout pack with less strength than one having less grout displacement. It is also to be appreciated that once the grout 30 sufficiently cures, tension will be applied to each anchor bolt 16 by the tightening of a nut at the top of base flange 14, causing the bolt to move relative to the grout. Ideally, sealing member 32 would remain stationary, allowing bolt 16 to slide through the sealing member 32. However, deformation of sealing member 32 reduces the ease with which anchor bolt 16 will slide through the sealing member, potentially causing sealing member 32 to also move, potentially damaging the surrounding grout 30.

Embodiments of the Present Invention

Figure 6:
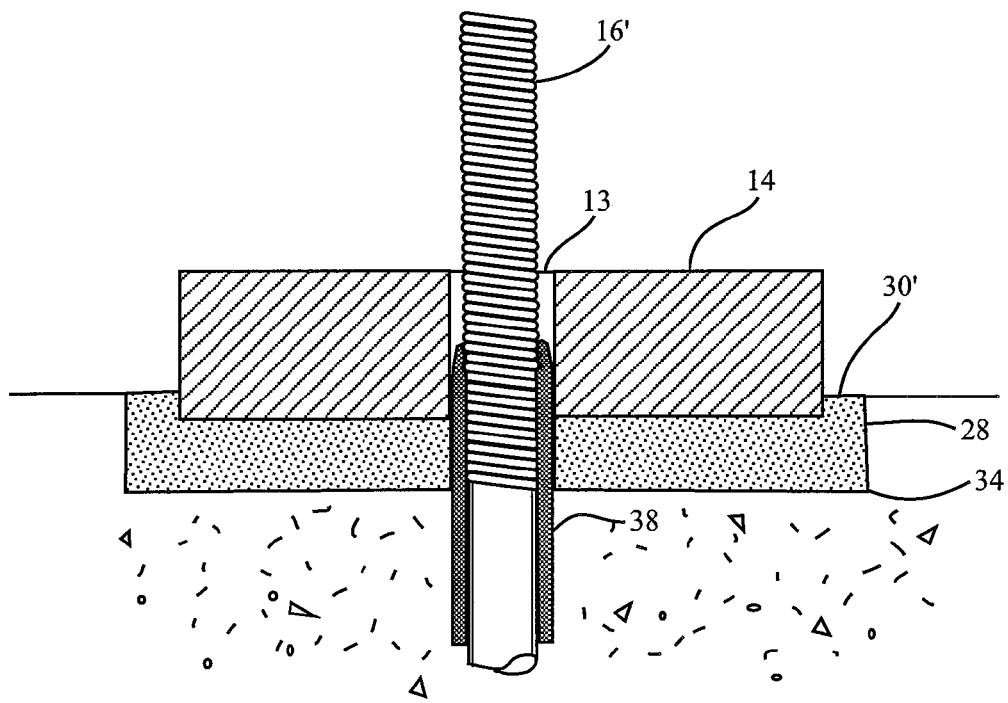
FIG. 6 shows a cross section of a portion of the base flange, grout, and sleeve of an embodiment of the present invention.

FIG. 6 shows a cross section of a portion of the base flange 14, grout 30', and sleeve 38 of an embodiment of the present invention. In contrast to the prior art shown in FIG. 5, it can be seen in FIG. 6 that the crimped sleeve 38 does not terminate at the bottom 34 of the grout trough 28, but rather extends upwardly through the space in which grout 30' will be placed and partially penetrates the bolt hole 13 of base flange 14. This feature prevents the top of crimped sleeve 38 from being exposed to the liquids which may be placed within grout trough 28. The use of crimped sleeve 38 as the protective sleeve for bolt 16' is a substantial departure from the present use of PVC sleeve 22.

The critical distinction between the presently disclosed crimped sleeves from the prior art sleeves is that the wall thickness of the crimped sleeve is substantially reduced, and the tolerance between the internal diameter of the crimped sleeve and the outer diameter of the bolt threads is substantially reduced, resulting in an external diameter of the crimped sleeve which is smaller than possible with the thicker-walled PVC sleeves, allowing the crimped sleeves to extend into the bolt holes 13 of the base flange 14. For example, a crimped sleeve comprising polypropylene sleeves has a closer tolerance than the available PVC, such that the crimped sleeves may have a clearance of 20 thousands of an inch between the internal diameter of the crimped sleeve and the outer diameter of the anchor bolt threads. As shown in FIG. 6, this smaller outside diameter of the crimped sleeve 38 allows a portion of the sleeve to be disposed within the holes 13 in the base flange 14 rather than terminating at the bottom 34 of the grout trough 28 as shown in FIG. 5 for the prior art sleeves. The PVC tubes presently in use as sleeves do not extend into the base flange 14 of the wind turbine. The diameters of bolt holes 13 for the base flanges 14 for wind turbines are approximately 1½ inch, and the external diameters of commonly available PVC tubes which may be utilized as hollow tubes for 1¼ inch to 1⅜ inch bolts are too large to be inserted within the holes of the flange.

Figure 7:
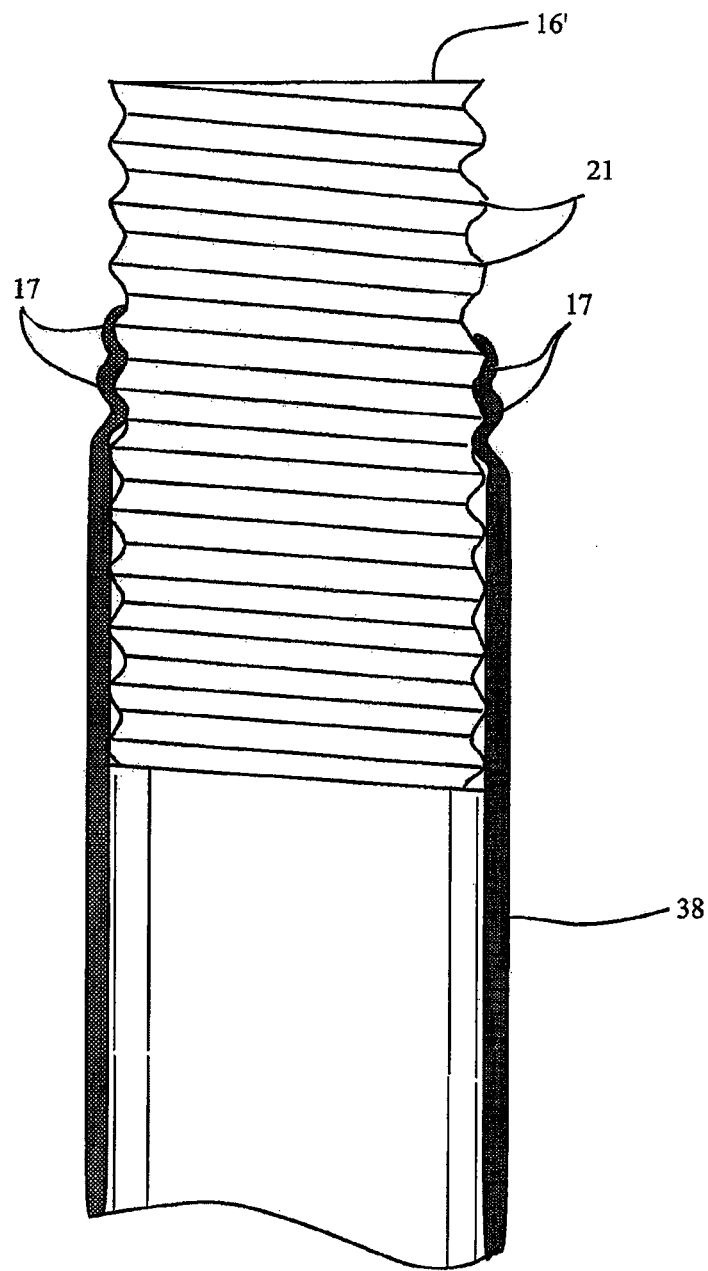
FIG. 7 shows a portion of an embodiment of the disclosed crimped sleeve, showing how the sleeve is swaged around some of the threads of the anchor bolt.

As shown in FIG. 6, and in greater detail in FIG. 7, the top of the crimped sleeve 38 is "swaged" such that a portion of the sleeve conforms to the threads of the anchor bolt 16'. The swaging serves several purposes. First, the swaging retains the crimped sleeve 38 on the anchor bolt 16' such that nuts are not required to retain the sleeve on the anchor bolt during transportation. This characteristic allows the anchor bolts 16' to be shipped without nuts, which reduces manpower required for placing the nuts on the bolts for transportation and removing of the bolts upon arrival.

The swaging further inhibits the flow of liquids into the annulus between the crimped sleeve 38 and the anchor bolt 16', although it is to be appreciated that the exposure of the sleeve end to liquid is reduced or eliminated, because of the capability of placing the top of the crimped sleeve 38 within the base flange 14 rather than disposed at the bottom 34 of the grout trough 28. It has been found that swaging approximately two inches of the top of the crimped sleeve 38 forms a sufficient length of "crimps" 17 (i.e., portions of the sleeve 38 which conform to the shape of individual threads 21) to form an interference fit which adequately inhibits liquid penetration into the sleeve-bolt annulus. It has been found that sleeves comprising polypropylene, or similar materials, have the desired mechanical properties for swaging the sleeve material such that it conforms to the shape of the threads. The mechanical properties of the polypropylene are such that the material has a "memory" and retains the crimps 17 once the swaging operation has been completed. It is also to be appreciated that when the anchor bolts 16' are tensioned by the tightening of the nuts 18, the mechanical properties of the sleeve material are such that upon tensioning of the anchor bolt 16', the material will plastically deform and the crimps will relax and allow relative movement of the anchor bolt with little resistance.

Figure 8:
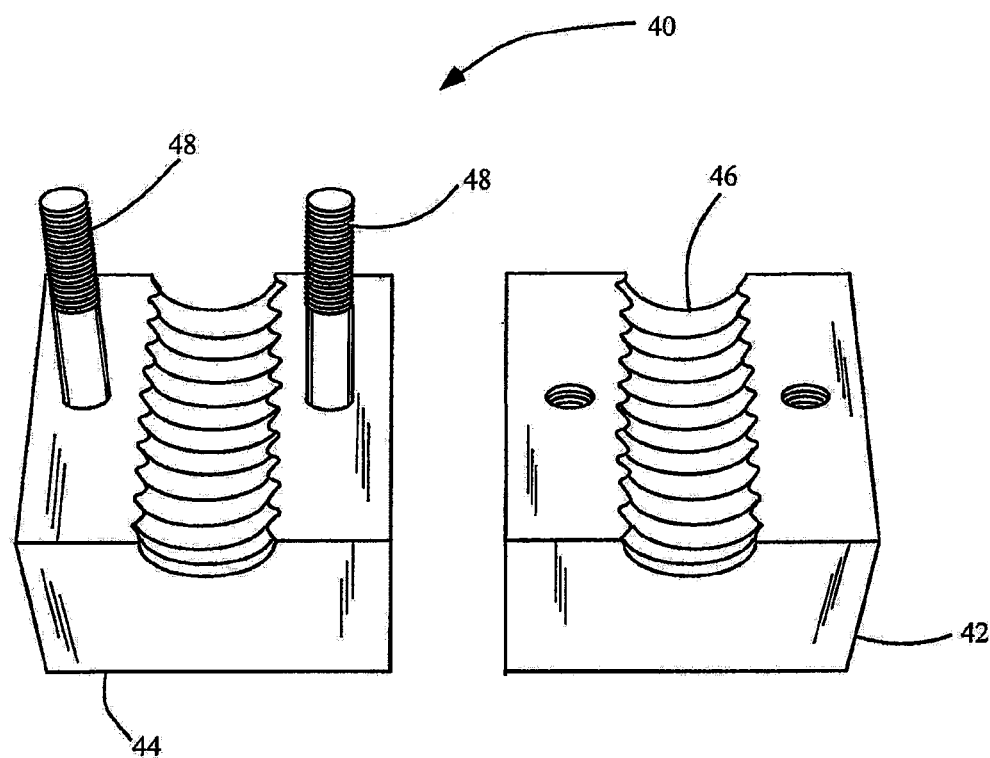
FIG. 8 shows an embodiment of a device which may be utilized for swaging the sleeve around the threads of the anchor bolt.
Figure 9:
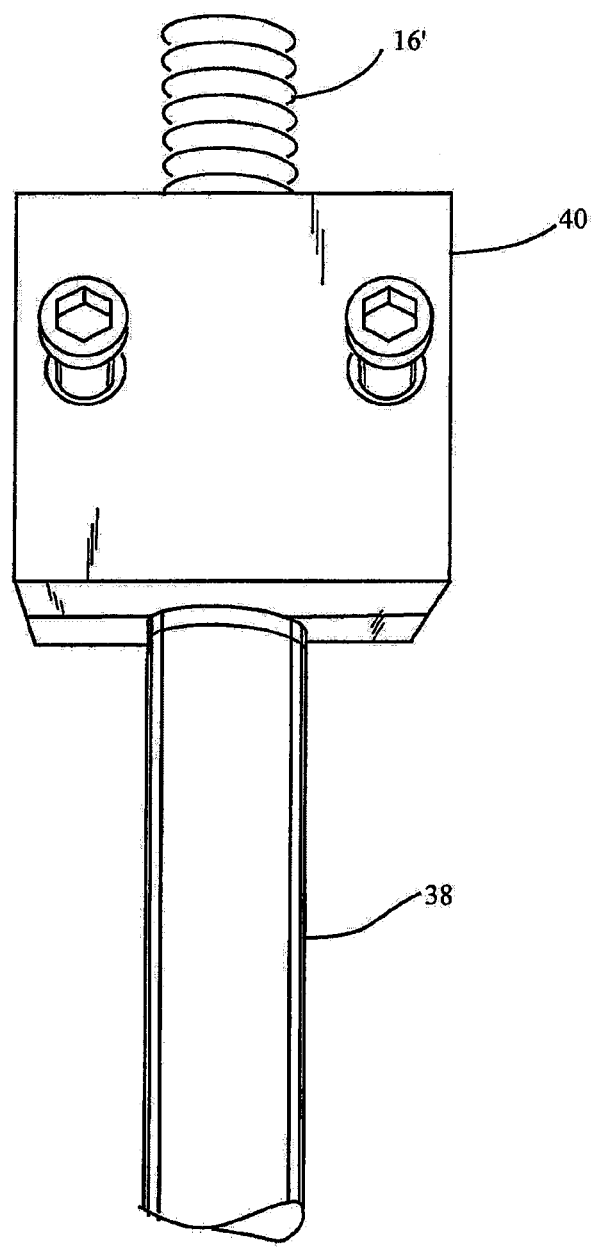
FIG. 9 shows the device of FIG. 7, showing how it is placed around an anchor bolt.
Figure 10:
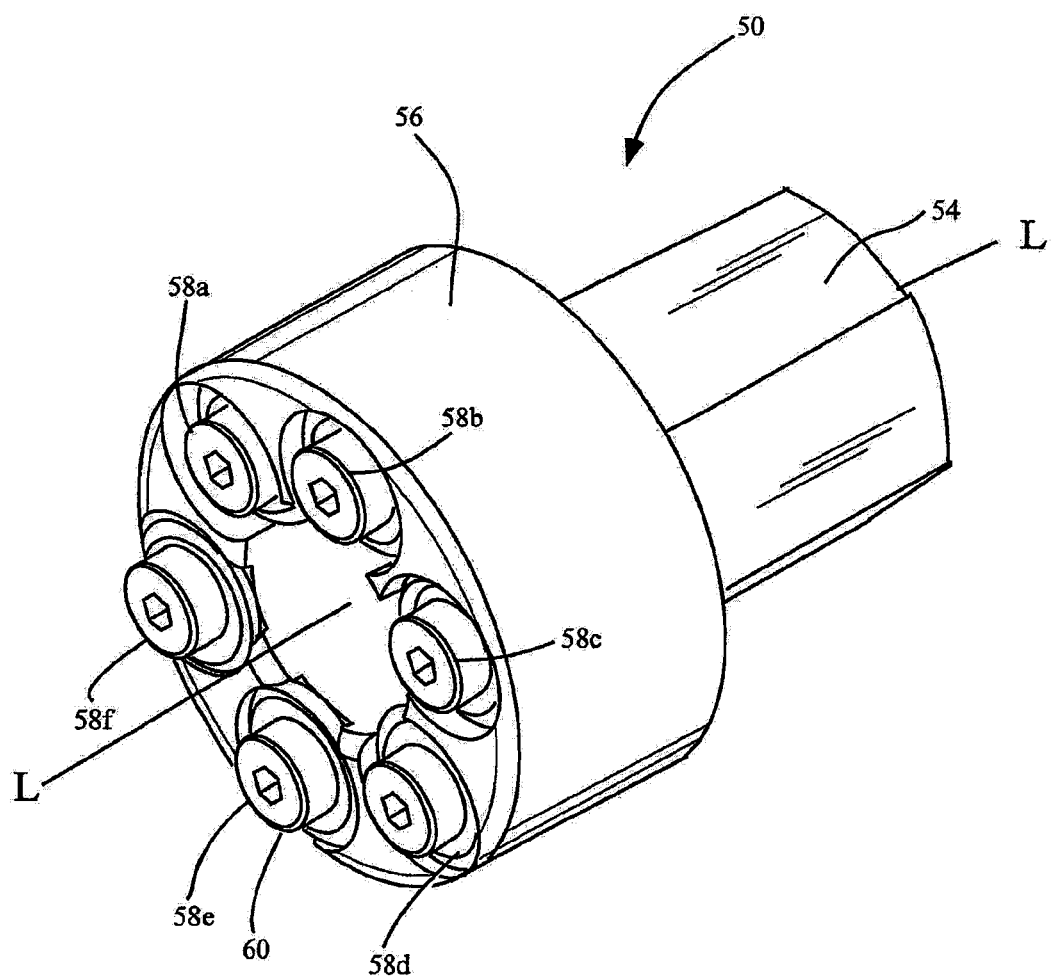
FIG. 10 shows perspective side view of an embodiment of another swaging device which may utilized for swaging the sleeve around the threads of the anchor bolt.
Figure 11:
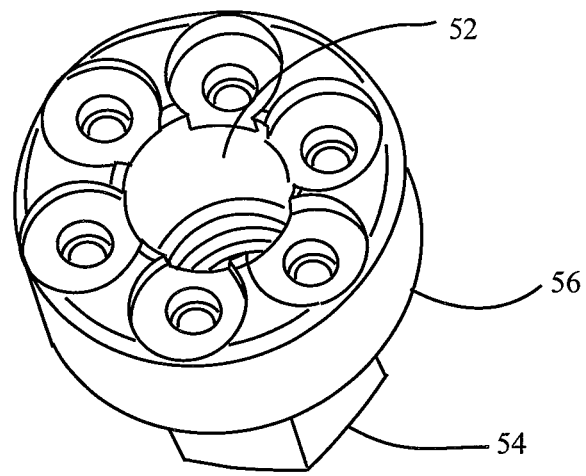
FIG. 11 shows a perspective front view of the swaging device of FIG. 10.
Figure 12:
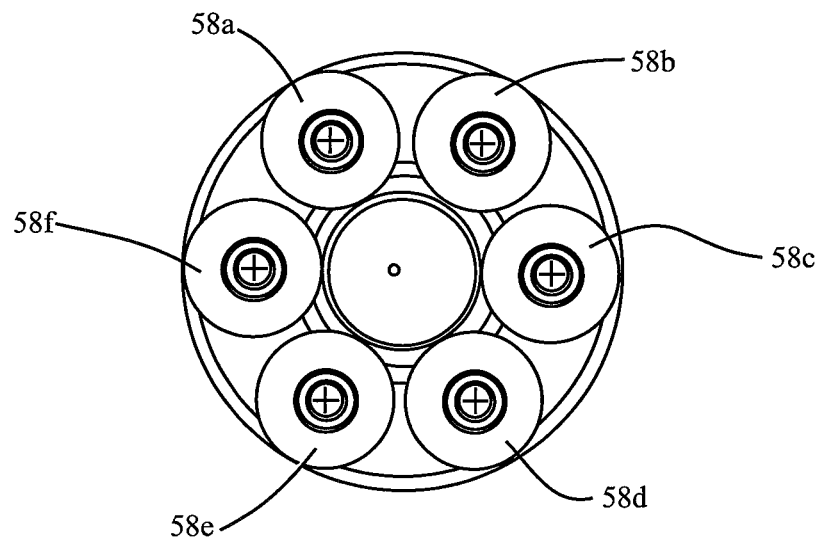
FIG. 12 shows a front view of the swaging device of FIG. 10.
Figure 13:
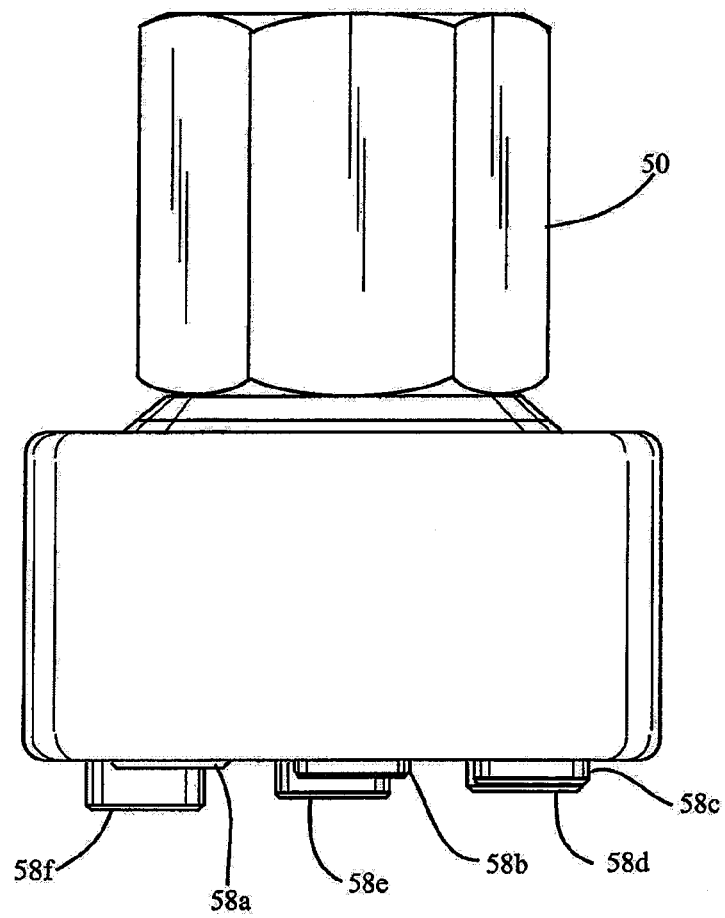
FIG. 13 shows a side vide of the swaging device of FIG. 10.

Also disclosed are swaging devices utilized in forming the crimped sleeves 38. FIGS. 8 and 9 show a die assembly 40 which may be utilized either with bolts 48 or with a hydraulic press to create the crimping of the crimped sleeve 38. Die assembly 40 comprises two sides, wherein each side comprises a thread profile 46 which matches the thread profile of the anchor bolt 16'. Compressing each side of the die assembly against a sleeve encased anchor bolt causes the crimped sleeve 38 to conform to the thread profile of the anchor bolt 16'.

FIGS. 10 through 13 show another embodiment of a swaging tool 50. This tool 50 comprises a swaging end 56 and a threaded end 54, which define a longitudinal axis L, wherein the longitudinal axis is at the center of the tool. The swaging tool 50 comprises an opening coinciding with the longitudinal axis L, and the threaded end comprises internal threads 52 which match the threads of the anchor bolt 16'. The swaging end 56 comprises a plurality of rollers 58a, 58b, 58c, 58d, 58e and 58f, each roller having the same diameter. Rollers 58a, 58b, 58c, 58d, 58e and 58f are arranged at different points along the length of the longitudinal axis L and have different radial distances from the longitudinal axis. Rollers 58a through 58f are attached to the swaging end with fasteners 60, such as bolts or screws.

The rollers 58a through 58f are disposed within the tool 50 to follow the threads 21 of an anchor bolt 16', compressing the sleeve into the threads to create the crimps 17. The rollers are disposed such that the center each roller is a different radial distance from the longitudinal axis L. It is to be appreciated that a different swaging tool 50 may be fashioned for each bolt diameter and thread type, including right-handed and left-handed threads.

By way of example only, for a tool having an overall radius of 2.0 inches, an inside diameter of 0.680 inches, and individual roller diameters of 1.250 inches, the centers of the rollers may have the following radial distances from the longitudinal axis L:

roller 58a: 1.391 inches
roller 58b: 1.415 inches
roller 58c: 1.295 inches
roller 58d: 1.319 inches
roller 58e: 1.343 inches
roller 58f: 1.367 inches Swaging tool 50, which may comprise suitable material such as 1080 steel, is made up on at the end of a sleeve-encased anchor bolt, with the swaging end 56 made up first. As swaging tool 50 is screwed onto the threads, the bolt will ultimately engage internal threads 52, which assist in guiding the tool. Once the swaging tool reaches the polypropylene sleeve, roller 58f will be the first roller to engage the sleeve, followed by 58e, etc., the rollers compressing the sleeve into the threads 21. The swaging tool 50 may be attached to both power tools and hand tools.

While the above is a description of various embodiments of the present invention, further modifications may be employed without departing from the spirit and scope of the present invention. Thus the scope of the invention should not be limited according to these factors, but according to the following appended claims.

What is claimed is:

1. A wind turbine installation comprising a base flange disposed upon a foundation, said base flange having a downwardly facing bottom and an upwardly facing top, said foundation comprising a structure of post-compressed cementitious material extending from an upper end thereof downwardly to a lower end thereof, said structure comprising a plurality of upright anchor bolts imbedded in and extending through the cementitious material, said anchor bolts having threaded upper ends projecting upwardly from said upper end of said structure and extending through said base flange, said anchor bolts comprising a sleeve continuously extending along the length of the anchor bolts throughout the entire structure and a portion of said sleeve extending inside the downwardly facing bottom of said base flange, said threaded upper ends of said bolts passing upwardly through the base flange and threaded nuts threaded upon said threaded upper ends above said upwardly facing top of the base flange and tightened downwardly thereover to place said anchor bolts under tension and thereby place said structure under heavy post-compression extending fully about said cylindrical structure in excess of maximum upset moment forces expected to be exerted on said foundation by an upright tower mounted from said base flange.

2. The wind turbine installation of claim 1 wherein the sleeve comprises polypropylene.

3. The wind turbine installation of claim 1 wherein the sleeve comprises a swaged end, the swaged end forming an interference fit with the threaded upper ends of the anchor bolts.

4. The wind turbine installation of claim 1 wherein the sleeve comprises a crimped end, the crimped end comprising a plurality of minor diameters and major diameters, each minor diameter and major diameter of the crimped end corresponding with a minor diameter and a major diameter of threads of the threaded upper end of the anchor bolt.

* * * * *